(12) United States Patent
Muldoon et al.

(10) Patent No.: US 8,541,133 B2
(45) Date of Patent: Sep. 24, 2013

(54) ELECTROCHEMICAL DEVICE WITH A MAGNESIUM ANODE AND A STABLE, SAFE ELECTROLYTE COMPATIBLE WITH SULFUR

(75) Inventors: John Muldoon, Saline, MI (US); Hee Soo Kim, Ann Arbor, MI (US); Masaki Matsui Matsui, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 461 days.

(21) Appl. No.: 12/913,253

(22) Filed: Oct. 27, 2010

(65) Prior Publication Data

US 2012/0107698 A1  May 3, 2012

(51) Int. Cl.
*H01M 10/054* (2010.01)
*H01M 10/056* (2010.01)

(52) U.S. Cl.
USPC ........................................ 429/199; 429/231.6

(58) Field of Classification Search
USPC ................................................ 429/120–347
See application file for complete search history.

(56) References Cited

U.S. PATENT DOCUMENTS

| | | | |
|---|---|---|---|
| 3,658,592 A | 4/1972 | Dey | |
| 3,849,868 A | 11/1974 | Jost | |
| 4,020,242 A | 4/1977 | Okazaki et al. | |
| 4,189,761 A | 2/1980 | Finkelstein et al. | |
| 4,366,215 A * | 12/1982 | Coetzer et al. | 429/199 |
| 4,710,310 A | 12/1987 | Shinozaki et al. | |
| 5,506,072 A | 4/1996 | Griffin et al. | |
| 6,030,720 A | 2/2000 | Chu et al. | |
| 6,265,109 B1 | 7/2001 | Yamamoto et al. | |
| 6,420,067 B1 | 7/2002 | Yoshioka | |
| 6,733,924 B1 | 5/2004 | Skotheim et al. | |
| 7,019,494 B2 | 3/2006 | Mikhaylik | |
| 7,029,796 B2 | 4/2006 | Choi et al. | |
| 7,189,477 B2 | 3/2007 | Mikhaylik | |
| 7,316,868 B2 | 1/2008 | Gorkovenko | |
| 7,354,680 B2 | 4/2008 | Mikhaylik | |
| 2003/0049524 A1 * | 3/2003 | Spillman et al. | 429/101 |
| 2005/0019670 A1 | 1/2005 | Amine et al. | |
| 2007/0082270 A1 | 4/2007 | Mikhaylik | |
| 2007/0172737 A1 | 7/2007 | Oki et al. | |

(Continued)

FOREIGN PATENT DOCUMENTS

| JP | 10040928 A | 2/1998 |
|---|---|---|
| JP | 2004-265675 | 9/2004 |

(Continued)

OTHER PUBLICATIONS

Ito et al. JP 2008-141160. Jun. 19, 2008. English machine translation by JPO.*

(Continued)

*Primary Examiner* — Basia Ridley
*Assistant Examiner* — James Lee
(74) *Attorney, Agent, or Firm* — Oblon, Spivak, McClelland, Maier & Neustadt, L.L.P.

(57) ABSTRACT

An electrochemical device, having an anode containing magnesium; a cathode stable to a voltage of at least 3.2 V relative to a magnesium reference; and an electrolyte containing a solvent and a LiCl complex of a magnesium halide salt of a sterically hindered secondary amine is provided. In a preferred embodiment the electrolyte contains tetrahydrofuran and 2,2,6,6-tetramethylpiperidinyl-magnesium chloride-lithium chloride complex.

20 Claims, 3 Drawing Sheets

(56) References Cited

U.S. PATENT DOCUMENTS

| | | |
|---|---|---|
| 2008/0102374 A1 | 5/2008 | Usami et al. |
| 2008/0182176 A1 | 7/2008 | Aurbach et al. |
| 2009/0068568 A1 | 3/2009 | Yamamoto et al. |
| 2009/0081557 A1 | 3/2009 | Chen et al. |
| 2009/0176988 A1 | 7/2009 | Knochel et al. |
| 2009/0226809 A1 | 9/2009 | Vu et al. |
| 2009/0239113 A1 | 9/2009 | Hase et al. |
| 2010/0040956 A1 | 2/2010 | Park |

FOREIGN PATENT DOCUMENTS

| | | | |
|---|---|---|---|
| JP | 2004259650 A | | 9/2004 |
| JP | 2005108527 A | | 4/2005 |
| JP | 2008-141160 | * | 6/2008 |
| JP | 2009-064731 | | 3/2009 |
| WO | WO 2010/053328 A2 | | 5/2010 |

OTHER PUBLICATIONS

International Search Report and Written Opinion issued Nov. 4, 2011, in PCT/US2011/042736.

Thomas D. Gregory, et al. "Nonaqueous Electrochemistry of Magnesium" J. Electrochem. Soc., vol. 137, No. 3, (pp. 775-780), 1990.

Z. Lu, et al. "On the Electrochemical Behavior of Magnesium Electrodes in Polar Aprotic Electrolyte Solutions" Journal of Electroanalytical Chemistry, vol. 466, (pp. 203-217) 1999.

D. Aurbach, et al. "Prototype Systems for Rechargeable Magnesium Batteries" Nature, vol. 407, (pp. 724-727) 2000, www.nature.com.

C. Liebenow, et al. "The Electrodeposition of magnesium Using Solutions of Organomagnesium Halides, Amidomagnesium Halides and Magnesium Organoborates" Electrochemistry Communications vol. 2, (pp. 641-645) 2000.

* cited by examiner

ELECTROCHEMICAL DEVICE WITH A MAGNESIUM ANODE AND A STABLE, SAFE ELECTROLYTE COMPATIBLE WITH SULFUR

CROSS REFERENCE TO RELATED APPLICATIONS

This application is related to prior U.S. patent application Ser. No. 12/758,343, filed Apr. 12, 2010, and prior U.S. patent application Ser. No. 12/768,017, filed Apr. 27, 2010, the disclosures of which are incorporated herein by reference.

BACKGROUND OF THE INVENTION

1. Field of the Invention

The present invention relates to an electrochemical device having an anode containing magnesium, a cathode; and an electrolyte containing a lithium chloride complex of a magnesium halide salt of a sterically hindered secondary amine. Most specifically the invention is directed to a magnesium sulfur electrochemical device having a stable and safe electrolyte which is compatible with a magnesium anode and a sulfur cathode.

2. Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Sulfur is an attractive cathode material due to its ready availability, low cost, relative nontoxicity and low equivalent weight. Additionally, sulfur has a theoretical maximum capacity of 1675 mAh/g. Therefore, sulfur used as a cathodic material in combination with a magnesium anode could provide a high capacity, safe and economic battery, potentially suitable for use in EV.

Production of a battery having an anode based on magnesium as the active material and a cathode based on sulfur as the active material, requires an electrolyte system which will efficiently transport magnesium ions and which will not adversely affect a sulfur cathode active material. In performance as a cathode active material sulfur is reduced to sulfide and polysulfide discharge products. These discharge products must remain available for oxidation during a charging stage. Moreover, to obtain a viable magnesium sulfur battery, an effective Mg electrolyte transport system cannot be chemically reactive to sulfur. Additionally, in consideration of production of commercial batteries, an electrolyte that can be safely stored, transported and handled is desired.

The electrochemical behavior of a magnesium electrode in a polar aprotic electrolyte solution was reported by Lu et al. in the Journal of Electroanalytical Chemistry (466 (1999) pp 203-217). These authors concluded that the electrochemical behavior of Mg is different from that of Li in polar aprotic electrolyte solutions. Their investigation showed that in contrast to the case of lithium electrodes, surface films which form on the Mg electrode in the aprotic solvents do not transport Mg ions. Therefore, conventional electrolyte systems employed in lithium transport systems are not suitable for a cell having a magnesium anode. Since Mg ion transport is an essential requirement for any electrochemical cell based on a magnesium anode, other electrolyte systems have been investigated.

Gregory et al. (J. Electrochem. Soc., 137 (3), March, 1990, 775-780) reported electrolyte systems of alkylmagnesium halide-organoboron complexes in an ether solvent. Also reported were alkylmagnesium halide solutions to which aluminum halides were added. Mg dissolution and plating at very high current efficiencies, giving bright crystalline Mg deposits were obtained in these systems. However, a suitable cathode material, compatible with the electrolyte system was not reported.

The most commonly used magnesium electrolyte to date is an organometallic material such as phenyl magnesium chloride/aluminum chloride in tetrahydrofuran. However, these electrolyte mixtures are not likely to be of practical commercial utility due to air and moisture sensitivity characteristic of such Grignard-based materials. Moreover, the phenyl magnesium chloride/aluminum chloride electrolyte has limited anodic stability, and significantly, such materials are highly nucleophilic and intrinsically strong reducing agents. This chemical reactivity character is problematic, because to construct an electrochemical cell employing a Grignard type electrolyte, a cathode material which is essentially chemically inert to the Grignard is required. The number of cathode functional materials meeting this requirement are limited. To date there have been two demonstrated cathodes which are compatible with organometallic electrolytes.

Aurbach et al. (NATURE, 407, Oct. 12, 2000, 724-726) describes an Mg battery system containing a magnesium organohaloaluminate salt in tetrahydrofuran (THF) or a polyether of the glyme type as electrolyte and a $Mg_xMo_3S_4$ cathode based on a $Mo_3S_4$ Chevrel phase host material. A similar cathode material described as having a formula $Mg_{(0-2)}Mo_6 S_{(8-n)}Se_n$ was also reported by Aurbach (Advanced Materials, 19, 2007, 4260-4267).

Yamamoto et al. (JP2007-233135) describe positive electrode active substances containing fluoro graphite or an oxide or halide of a metal element such as scandium, titanium, vanadium, chromium, manganese iron, cobalt, nickel, copper and zinc. The experimental examples are based on $MnO_2$.

However, the organometallic electrolytes employed in the above magnesium electrolyte systems are highly reactive with sulfur and are known to directly react with sulfur to form sulfides by nucleophilic attack (The Chemistry of the Thiol Group, Pt 1; Wiley, New York, 1974, pp 211-215). Therefore, in order to produce a Mg/S battery, a new electrolyte system which meets all the requirements for magnesium ion transport described previously while having low or no chemical reactivity toward sulfur is required.

U.S. Pre-Grant Publication No. 2009/0226809 to Vu et al. describes a cathode for a lithium-sulfur battery (Abstract). A metal oxide selected from Group I and II metals is included in the composition of a sulfur cathode composition [0012]. The anode contains lithium and the electrolyte described is composed of a lithium salt in a nonaqueous solvent system [0032].

U.S. Pre-Grant Publication No. 2008/0182176 to Aurbach et al. describes an electrochemical cell having a magnesium anode and an intercalation cathode having a modified Chevrel phase. The Chevrel phase compound is represented by the formula $Mo_6S_{8-y}Se_y$ (y is greater than 0 and less than 2) or $M_xMo_6S_8$ (x is greater than 0 and less than 2). The electrolyte is represented by the formula $Mg(AlR_xCl_{4-x})_2$ and/or $(MgR_2)_x$—$(AlCl_{3-n})_y$ wherein R is methyl, ethyl, butyl, phenyl and derivatives thereof, n is greater than 0 and lower than 3, x is greater than 0 and lower than 3 and y is greater than 1 and lower than (Claim 3) in an ether solvent.

U.S. Pat. No. 7,316,868 to Gorkovenko describes an electrochemical cell having a lithium anode, a cathode of an electroactive sulfur containing composition and a nonaqueous electrolyte containing a lithium salt and a solvent mixture of dioxolane and one or more of 1,2-dialkoxyalkanes of 5 or 6 carbons and 1,3-dialkoxyalkanes of 5 or 6 carbon atoms (Claim 1). Electroactive sulfur compounds include elemental sulfur and organic compounds having sulfur and carbon atoms(Col. 4, lines 10-26).

U.S. Pat. No. 7,189,477 to Mikhaylik describes an electrochemical cell having a lithium anode, a cathode of a sulfur containing material and an electrolyte system composed of a lithium salt (Col. 4, lines 5-22) and a non-aqueous oxygen containing organic solvent selected from acyclic ethers, cyclic ethers, polyethers and sulfones.

U.S. Pat. No. 7,029,796 to Choi et al. describes a lithium sulfur battery having a cathode of an agglomerated complex of sulfur and conductive agent particles (Claim 1). A solid or liquid electrolyte can be employed and a liquid electrolyte is a nonaqueous organic solvent and a lithium salt (Col. 8, lines 43-58).

U.S. Pat. No. 6,733,924 to Skotheim et al. describes lithium sulfur battery wherein the lithium is protected by a surface coating of a metal such as copper, magnesium, aluminum, silver, etc. (Col. 12, lines 25-28). The electrolyte may be comprised of ionic salts in a non-aqueous solvent, gel polymer or polymer. Ionic electrolyte salts are lithium salts (Col. 15, line 26 to Col. 16, line 27).

U.S. Pat. No. 6,420,067 to Yoshioka describes a hydrogen storage negative electrode being a Mg alloy of Ni, Zn, and Zr (Abstract). The positive electrode is composed of a metal oxide (Col. 3, lines 17-19) and an aqueous electrolyte Col. 7, lines 16-18).

U.S. Pat. No. 6,265,109 to Yamamoto et al. describes air batteries with a negative electrode of a magnesium alloy (Col. 4, lines 9-33). The electrolyte is composed of an acid amide and a second solvent selected from dimethyl acetoamide, acetonitrile, ethylene carbonate, propylene carbonate and γ-butyrolactam (Col. 3, lines 1-15) and magnesium salt of a halogenide or a perchlorate.

U.S. Pat. No. 5,506,072 to Griffin et al. describes a battery having a cathode of finely divided sulfur and finely divided graphite packed about a solid graphite electrode (Col. 3, lines 48-51), an anode containing magnesium and an electrolyte of a corresponding magnesium halide and ionic sulfide as an aqueous electrolyte solution (Col. 3, line 65-Col. 4, line 1).

U.S. Pat. No. 4,020,242 to Okazaki et al. describes a primary cell containing a spacer which contains electrolyte and reduces its apparent volume when pressure is applied by volume increase of the cathode or anode (Abstract). A cell composed of a lithium anode and a cathode of carbon fluoride, silver chromate, manganese dioxide, cupric oxide or vanadium pentoxide and a nonaqueous electrolyte is described (Claim 15).

U.S. Pat. No. 3,849,868 to Jost describes a battery having a container of a composite metal laminate having a layer of magnesium bonded to a laminate material (Abstract). A graphite rod serves as the cathode (Col. 4, line 66 to Col. 5, line 3) and an electrolyte mixture contains manganese dioxide, finely divided carbon and a chromate in an aqueous solution of a bromide salt (Col. 4, lines 48-59).

U.S. Pat. No. 3,658,592 to Dey describes an electric cell having an anode of a light metal (Col. 1, lines 63-67), a cathode of a metal chromate (Col. 1, lines 68-72) and a non-aqueous electrolyte containing inorganic salts of light metals in organic solvents (Col. 1, line 73 to Col. 2, line 9). Magnesium is listed as a light metal.

JP 2004-259650 to Fumihito describes a battery having a magnesium anode and an intercalation cathode of a transition metal (Abstract). A cathode of vanadium pentoxide and graphite is described in Example 1. The electrolyte is a polymer gel containing a phenyl magnesium halide in tetrahydrofuran.

JP 2004-265675 to Hideyuki et al. describes a test cell constructed with a sulfur containing anode and a negative electrode of magnesium metal. Magnesium bis(trifluoromethylsulfonyl)imide in γ-butyrolactone is employed as an electrolyte system.

U.S. Pre-Grant Publication No. 2010/0040956 to Park describes a lithium ion secondary cell constructed from electrodes which intercalate lithium ion, a separator and a non-aqueous electrolyte of a lithium salt in an organic solvent. The electrolyte further contains a polymer which includes heterocyclic amine groups, such as poly(2-vinylpyridine). The organic solvent is a mixture of organic carbonates.

U.S. Pre-Grant publication No. 2009/0081557 to Chen et al. describes lithium air batteries containing a negative electrode, an air positive electrode and a non-aqueous electrolyte of a lithium salt and a solvent which is a poly(ethyleneoxide) derivative of a silane or phosphate.

U.S. Pre-Grant publication No. 2008/0102374 to Usami et al. describes a lithium secondary battery wherein one or both electrodes contains a polymeric active material based on a heterocyclic system. The electrolyte included is a conventional lithium system containing a lithium salt in an organic solvent such as an organic carbonate, or cyclic ether.

U.S. Pat. Nos. 7,019,494 and 7,354,680 and U.S. Pre-Grant publication No. 2007/0082270 to Mikkaylik describes an electrochemical cell containing a lithium anode and a cathode having an electroactive sulfur material. The electrolyte is an ionic electrolyte lithium salt in a non-aqueous solvent selected from acetals, ketals, sulfones, acyclic ethers, cyclic ethers, glymes, polyethers and dioxolanes. The electrolyte further contains an ionic N—O additive such as an inorganic nitrate, an organic nitrate or an inorganic nitrite. Tetramethyl piperidine N-oxide is described as an organic N—O additive.

U.S. Pat. No. 4,710,310 to Shinozaki et al. describes a non-aqueous electrolyte for an electrolytic capacitor. The electrolyte contains an aprotic solvent and a complex of a N-substituted alkyl N-heterocyclic compound and a fluoroacid such as tetrafluoroboric acid and hexafluorophosphoric acid.

U.S. Pat. No. 4,189,761 to Finkelstein et al. describes valve metal electrolytic capacitors containing ammonium salts obtained by reaction of a trialkyl phosphate and an amine.

Typical valve metals are aluminum and tantalum. Exemplary amines include piperidine, piperazine and morpholine. In the course of the reaction the heterocyclic nitrogen is alkylated to form the ammonium salt.

U.S. Pre-Grant publication No. 2005/0019670 to Amine et al. describes a stabilized electrolyte for an alkali metal electrochemical device, specifically a lithium secondary battery. The electrolyte contains an alkali metal salt, a polar aprotic solvent, an organoamine and a metal-chelated borate salt. Piperidine and vinyl piperidine are cited as organoamines.

JP 2005-108527 to Kawamoto et al. describes a lithium secondary battery containing an electrolyte composed of a carbonate or glyme solvent, a lithium salt and an additive of a silazane derivative, a substituted piperidine or a secondary or tertiary amine. The anode of the secondary battery is a carbon based active system or a lithium metal or alloy. The cathode is a conventional cathode material such as a lithium metal oxide.

JP 10040928 to Yanai et al. describes a nonaqueous lithium battery having a lithium active anode and a cathode based on a metal oxide. The electrolyte solvent is an organic carbonate, sulfolane, lactone, ether or ester and the active salt is a lithium salt soluble in the solvent. Piperidine or a substituted piperidine is added to the electrolyte to stabilize the battery to self discharge.

None of the above documents discloses a practically functional electro-chemical device having an anode containing a magnesium, a cathode containing sulfur and a stable and safe electrolyte system which is effective for the transport of Mg ions and compatible both with an Mg containing active material electrode and also a sulfur containing active material electrode.

SUMMARY OF THE INVENTION

One object of the present invention is to provide an electrolyte system for an electrochemical device having a magnesium anode which is suitable in performance, ease of manufacture, safety and cost and thus be suitable for use in a commercial battery.

A second objective of the present invention is to provide an electrolyte system for an electrochemical device having a magnesium anode and a cathode containing sulfur which is stable, safe and facile to handle in a production environment.

A third objective of the present invention is to provide a magnesium sulfur battery which has excellent performance, low cost and is safe to produce and handle.

A fourth object of the present invention is to provide a method for preparing an electrochemical device having an anode containing magnesium as the active material and a compatible, high performance nonaqueous electrolyte system which is stable, safe and easy to handle.

This and other objects, individually or in combinations thereof, have been achieved by the present invention, a first embodiment of which includes an electrochemical cell, comprising:
an anode comprising magnesium as an active component;
a cathode; and
an electrolyte;
wherein
the electrolyte comprises a solvent and a LiCl complex of a magnesium halide salt of a sterically hindered secondary amine.

In a preferred embodiment of the present invention the sterically hindered secondary amine is a substituted cyclic secondary amine containing 5 to 7 ring atoms.

In a highly preferred embodiment of the present invention the sterically hindered secondary amine is a 2,2,6,6-tetra-alkylpiperidine wherein the substituent alkyl groups contain 1 to 6 carbon atoms.

In a specific embodiment the present invention provides an electrochemical cell, comprising:
an anode comprising magnesium as an active component;
a cathode comprising sulfur as an active component; and
an electrolyte comprising a solvent and a LiCl complex of a magnesium halide salt of a 2,2,6,6-tetra-alkylpiperidine wherein the substituent alkyl groups contain 1 to 6 carbon atoms.

In a further highly preferred embodiment, the present invention provides a battery, comprising:
an anode comprising magnesium as an active component;
a cathode comprising sulfur as an active component; and
an electrolyte comprising a solvent and 2,2,6,6-tetramethylpiperidinyl-magnesium chloride-lithium chloride complex (TMPMgCl—LiCl).

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Figure 1:
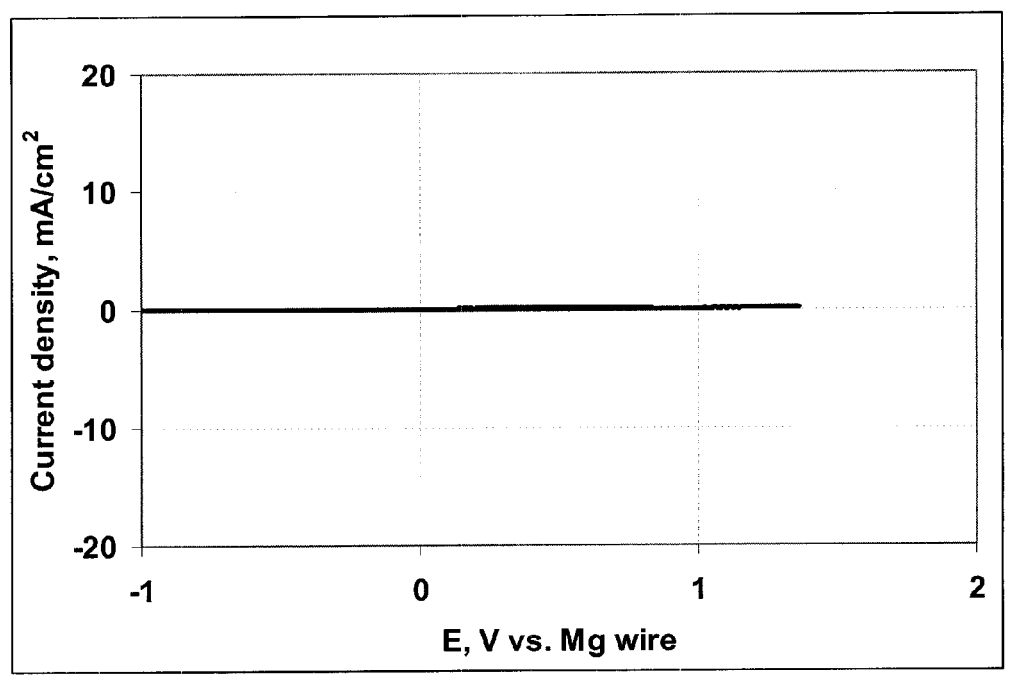
FIG. 1 shows the results of cyclicvoltammogram study of Mg deposition from $Mg(TFSI)_2$.

The inventors have recognized that to successfully prepare a magnesium-sulfur battery or electrochemical device, an effective magnesium ion transport electrolyte system which is stable to reduction on metallic magnesium and not nucleophilically reactive toward sulfur is required. Stability to reduction on magnesium is necessary to prevent formation of passivating films on the surface of the magnesium which inhibit passage of the magnesium ion. Additionally, to be commercially viable, the device should contain an electrolyte system that is significantly improved in safety, stability and ease of handle in a production environment in comparison to the conventional Mg electrolytes based on Grignard chemistry. Thus, the inventors investigated the voltammetric behavior of bis(trifluormethylsulfonyl)magnesium chloride described as in JP 2004-265675 and found that this material is not compatible with magnesium and is in fact reduced by magnesium. This behavior is shown in FIG. 1.

Recognizing the above stated requirements, the inventors have searched for possible suitable electrolyte systems and have described magnesium salts of non-nucleophilic bases containing nitrogen for utility as components of an electrolyte system for the transport of magnesium ions in related U.S. application Ser. No. 12/758,343.

Hexamethyl disilazide magnesium chloride is known to reversibly deposit and dissolve Mg. Liebenow et al. (Electrochem. Com. 2000, 641-645) describe a high reoxidation efficiency of magnesium electrodeposited from solutions of organomagnesium halides and amidomagnesium halides.

Conductivity data in THF for N-methylanilylmagnesium bromide, pyrrylmagnesium bromide and bis(trimethylsilyl)magnesium chloride (hexamethyl disilazide magnesium chloride) was reported along with a cyclic voltammogram for bis(trimethylsilyl)magnesium chloride. However, it was reported that a complete reoxidation of magnesium deposited from bis(trimethylsilyl)-magnesium chloride could not be achieved and some percent of electrochemical active magnesium was lost per cycle.

The present inventors investigated the electrolytic behavior of bis(trimethylsilyl)imido magnesium chloride in comparison to a conventional phenylmagnesium chloride/AlCl$_3$ electrolyte in THF solution. Analysis of cyclic voltammetry data showed that the coulombic efficiency (CE) of Mg deposition/dissolution was 100% at three different scan rates (5, 25 and 100 mV/sec).

Figure 2:
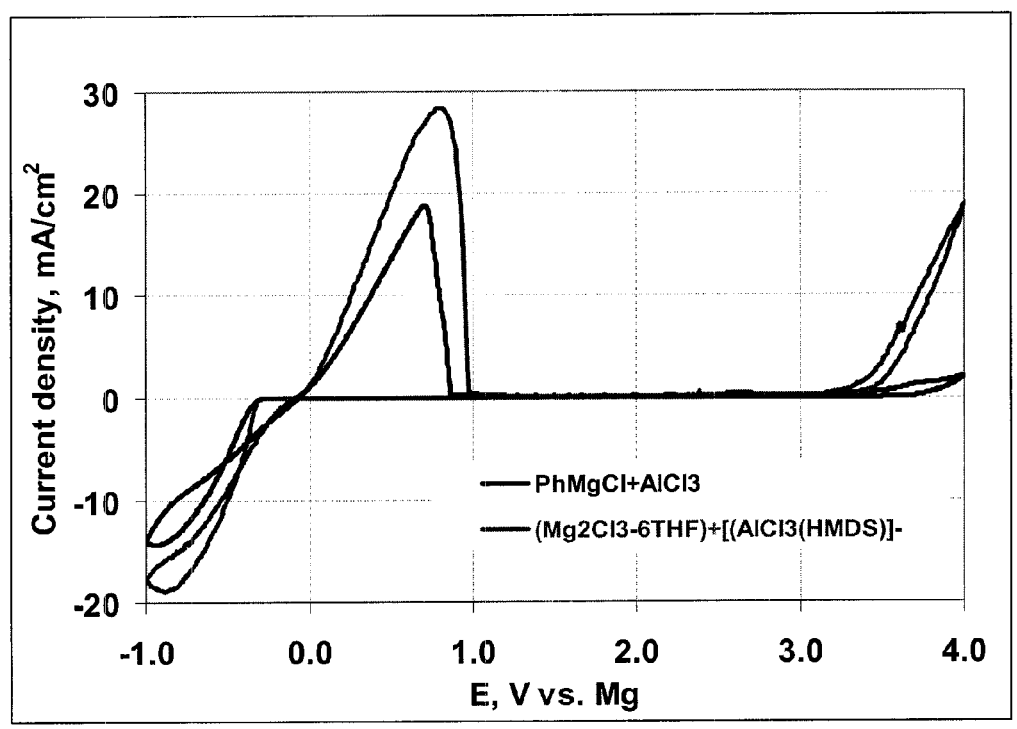
FIG. 2 shows the cyclicvoltammogram study of $(Mg_2Cl_3.6THF)^+[AlCl_3(HMDS)]^-$ in comparison to ($PhMgCl+AlCl_3$).

Hexamethyl disilazide magnesium chloride (HMDSMC) had a higher Mg deposition overpotential and lower current density compared to the conventional Mg electrolyte. FIG. 2 shows the Mg deposition overpotential is −0.40V for HMDSMC while the overpotential for the conventional system is −0.33V. Unexpectedly, the Inventors discovered that when aluminum chloride was combined with the HMDSMC, the performance of the system was significantly improved. As shown in FIG. 2, addition of AlCl$_3$ to HMDSMC resulted in a decrease of the Mg deposition overpotential from −0.40 to −0.29 V, thus making it comparable to the −0.33 value of the conventional system. Thus, the HMDSMC/AlCl$_3$ electrolyte showed higher current density and lower overpotential compared to HMDSMC or PhMgCl+AlCl$_3$ systems. The inventors concluded that HMDSMC/AlCl$_3$ electrolyte would likely result in higher cell voltage and therefore higher energy density when adapted in a practical battery system.

Upon further study of related secondary amine containing electrolyte systems the inventors have discovered the present invention as described in the appended claims and as follows.

Figure 3:
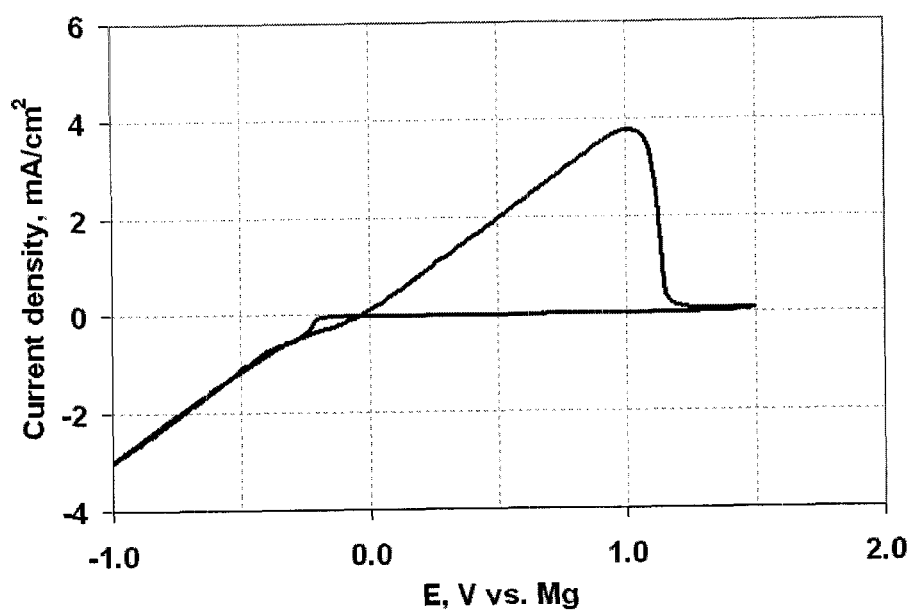
FIG. 3 shows the results of cyclicvoltammogram study of Mg deposition from a TMPMgCl—LiCl electrolyte.

The inventors have surprisingly found that other bulky, non-nucleophilic compounds may be suitable for electrolyte systems for Mg/S electrochemical cells. For example as shown in FIG. 3 the Mg deposition overpotential of TMPMgCl—LiCl is around 200 mV, in comparison to (Mg$_2$Cl$_3$-6THF)$^+$[AlCl$_3$(HMDS)]$^−$ which has an overpotential of over 300 mV. Such lower overpotential may contribute to increase the performance of an electrochemical device containing an electrolyte system based on TMPMgCl—LiCl.

Therefore, in a first embodiment, the present invention provides an electrochemical cell, comprising:
an anode comprising magnesium as an active component;
a cathode; and
an electrolyte;
wherein
the electrolyte comprises a solvent and a LiCl complex of a magnesium halide salt of a sterically hindered secondary amine.

In a preferred embodiment of the present invention the sterically hindered secondary amine is a substituted cyclic secondary amine containing 5 to 7 ring atoms.

In a highly preferred embodiment of the present invention the sterically hindered secondary amine is a 2,2,6,6-tetraalkylpiperidine wherein the substituent alkyl groups contain 1 to 6 carbon atoms.

In a specific embodiment the present invention provides an electrochemical cell, comprising:
an anode comprising magnesium as an active component;
a cathode comprising sulfur as an active component; and
an electrolyte comprising a solvent and a LiCl complex of a magnesium halide salt of a 2,2,6,6-tetra-alkylpiperidine wherein the substituent alkyl groups contain 1 to 6 carbon atoms.

In a further highly preferred embodiment, the present invention provides a battery, comprising:
an anode comprising magnesium as an active component;
a cathode comprising sulfur as an active component; and
an electrolyte comprising a solvent and 2,2,6,6-tetramethylpiperidinyl-magnesium chloride-lithium chloride complex (TMPMgCl—LiCl).

Examples of cathode active materials according to the invention may include sulfur, MnO$_2$ and a Chevrel compound having a formula Mg$_x$Mo$_6$T$_n$, wherein x is a number from 0 to 4, T is sulfur, selenium or tellurium, and n is 8.

A MnO$_2$ cathode is known in the art and is described for example in JP2007-233134.

Chevrel compounds having a formula Mg$_x$Mo$_6$T$_n$, wherein x is a number from 0 to 4, T is sulfur, selenium or tellurium are described in NATURE, 407, Oct. 12, 2000, 724-726.

Cathodes containing sulfur as the active ingredient are known in the art and are described for example in U.S. Pat. No. 6,733,924, U.S. Pat. No. 7,029,796 and U.S. Pre-Grant Publication No. 2009/0226809.

Importantly, sulfur is such a cathode active material and the invention therefore allows for the construction of an electrochemical device having sulfur as the active ingredient of a cathode. At the same time, the electrolyte system of the present invention is equal to conventional systems as a Mg ion electrolyte with an anode containing magnesium as the active ingredient.

Accordingly, a functional Mg/S electrochemical device may be constructed according to the present invention.

Therefore, the present invention provides an electrochemical device comprising an anode containing magnesium, a cathode stable to a voltage of at least 3.2 V relative to a magnesium reference and an electrolyte containing a solvent and a magnesium halide salt of a sterically hindered secondary amine.

Preferably, the sterically hindered secondary amine is a substituted cyclic secondary amine having 5 to 7 ring atoms. Most preferably the cyclic secondary amine is tetra-substituted in the ring positions immediately adjacent to the secondary amine nitrogen, i.e., each adjacent carbon is bonded to two substituents which provides steric hindrance to approach to the secondary nitrogen. Preferably, the substituents are independently of one another alkyl groups having 1-6 carbon atoms. Most preferably the substituents are methyl or ethyl groups. In terms of cost and availability, the tetramethyl substituted structures are preferred.

The cyclic secondary amine may be a substituted pyrrolidine, a substituted piperidine a substituted piperazine or a substituted hexamethyleneimine.

The halide may be F, Cl, Br or I, preferably Cl or Br and most preferably Cl. Magnesium chloride is most preferred in consideration of availability, cost and ease of handling.

The ether solvent may be one or more of tetrahydrofuran, ethylene glycol dimethyl ether and bis 2-methoxy ethyl ether in consideration of safety and ease of handling. Tetrahydrofuran may be most preferred, although other reaction requirements may dictate the necessity for an ether with different physical properties.

The anode containing magnesium as the active ingredient may be of any form known to one of ordinary skill in the art which is suitable for an electrochemical device according to the present invention.

In a particularly preferred embodiment, the present invention provides an electrochemical device having a cathode containing sulfur as an active ingredient, an anode having magnesium as the active ingredient and the electrolyte system comprises a solvent and a LiCl complex of a magnesium halide salt of a sterically hindered secondary amine. The sterically hindered secondary amine may be a substituted cyclic secondary amine comprising 5 to 7 ring atoms, having tetra-substitution in the ring positions immediately adjacent to the secondary amine nitrogen. The sterically hindered cyclic secondary amine is at least one selected from the group consisting of a tetrahydropyrrole, a piperidine, a hexamethyleneimine and a piperazine. Preferably, the sterically hindered cyclic secondary amine is a 2,2,6,6-tetra-alkylpiperidine, having alkyl groups of 1-6 carbon atoms and most preferably the 2,2,6,6-tetra-alkylpiperidine is 2,2,6,6-tetramethylpiperidine.

In a most particularly preferred embodiment, the present invention provides an electrochemical device having a cathode containing sulfur as an active ingredient, an anode having magnesium as the active ingredient and the electrolyte system comprises a solvent and a LiCl complex of a magnesium halide salt of 2,2,6,6-tetramethylpiperidine. The solvent may be one or more of tetrahydrofuran, ethylene glycol dimethyl ether and bis 2-methoxy ethyl ether in consideration of safety and ease of handling. Tetrahydrofuran may be most preferred. Chloride may be the preferred halide.

The electrochemical device according to the invention may be constructed by methods which are conventionally known. In general the method may include:

connecting an anode comprising magnesium and a cathode stable to a voltage of at least 3.2 V relative to a magnesium reference via an external electrically conductive structure; and contacting the anode and cathode with an electrolyte comprising a solvent and a LiCl complex of a magnesium halide salt of a sterically hindered secondary amine.

Having generally described this invention, a further understanding can be obtained by reference to certain specific examples which are provided herein for purposes of illustration only and are not intended to be limiting unless otherwise specified. Skilled artisans will recognize the utility of the devices of the present invention as a battery as well as the general utility of the electrolyte system described herein.

EXAMPLES

Example 1

In a glovebox, 1.574 ml of a 1.27 M solution of hexamethyl disalazide magnesium chloride in THF was added to 1.426 ml of dried THF in a screw capped vial. The resulting mixture was rapidly stirred. The solution was then allowed to stand for a few minutes and after standing, 2 ml of 0.5 M $AlCl_3$ (0.5 eq) in THF was added. This mixture was stirred for 48 hours.

Example 2

In a glovebox, 3.17 ml of a 1.27 M solution of bishexamethyl disalazide magnesium in THF was added to 1.426 ml of dried THF in a screw capped vial. The resulting mixture was rapidly stirred. The solution was then allowed to stand for a few minutes and after standing, 2 ml of 0.5 M $AlCl_3$ (0.5 eq) in THF was added. This mixture was stirred for 48 hours.

Example 3

The following THF solutions were prepared:
0.40 M PhMgCl/0.2 M $AlCl_3$
0.40 M $((CH_3)_3Si)_2NMgCl$
0.40 M $((CH_3)_3Si)_2NMgCl/0.2$ M $AlCl_3$ Cyclicvoltammograms of each solution were obtained at a scan rate of 25 mV/sec employing a Pt disk as Working electrode; Mg wire as reference electrode and Mg ribbon as counter electrode.

The three cyclicvoltammograms are shown in FIG. 2. The claimed electrolyte combination is thus comparable in performance to conventional Grignard electrolytes.

Example 4

1M solution of TMPMgCl—LiCl 2,2,6,6-tetramethylpiperidinylmagnesium chloride lithium chloride complex solution was purchased from Sigma-Aldrich, and was directly used for the electrochemical measurements. The cyclicvoltammogram is shown in FIG. 3.

The invention claimed is:

1. An electrochemical cell, comprising:
an anode comprising magnesium as an active component;
a cathode; and
an electrolyte;
wherein
the electrolyte comprises a solvent and a LiCl complex of a magnesium halide salt of a sterically hindered secondary amine, the salt having a direct association of the magnesium of the halide salt with the nitrogen of the sterically hindered secondary amine.

2. The electrochemical cell according to claim 1, wherein the sterically hindered secondary amine is a substituted cyclic secondary amine comprising 5 to 7 ring atoms.

3. The electrochemical cell according to claim 2, wherein the cyclic secondary amine is tetra-substituted in the ring positions immediately adjacent to the secondary amine nitrogen.

4. The electrochemical cell according to claim 1, wherein the halide of the magnesium halide salt is at least one selected from the group consisting of F, Cl, Br and I.

5. The electrochemical cell according to claim 4, wherein the halide is Cl.

6. The electrochemical cell according to claim 5, wherein the solvent is tetrahydrofuran.

7. The electrochemical cell according to claim 2, wherein the sterically hindered cyclic secondary amine is at least one selected from the group consisting of a tetrahydropyrrole, a piperidine, a hexamethyleneimine and a piperazine.

8. The electrochemical cell according to claim 7, wherein the sterically hindered cyclic secondary amine is a 2,2,6,6-tetra-alkylpiperidine, having alkyl groups of 1-6 carbon atoms.

9. The electrochemical cell according to claim 8, wherein the 2,2,6,6-tetra-alkylpiperidine is 2,2,6,6-tetramethylpiperidine.

10. The electrochemical cell according to claim 1, wherein the LiCl complex of a magnesium halide salt of a sterically hindered secondary amine is 2,2,6,6-tetramethylpiperidinylmagnesium chloride-lithium chloride complex.

11. The electrochemical cell according to claim 1, wherein the solvent comprises at least one selected from the group consisting of an acetal, a ketal, a sulfone, an acyclic ether, a cyclic ether, a glyme, a polyether and a dioxolane.

12. The electrochemical cell according to claim 11, wherein the solvent comprises a cyclic ether.

13. The electrochemical cell according to claim 12, wherein the cyclic ether is tetrahydrofuran.

14. The electrochemical cell according to claim 1, wherein the cathode is stable to a voltage of at least 3.2 V relative to a magnesium reference.

15. The electrochemical cell according to claim 14, wherein the cathode stable to a voltage of at least 3.2 V relative to a magnesium reference comprises elemental sulfur.

16. A battery comprising the electrochemical cell according to claim 1.

17. A battery comprising the electrochemical cell according to claim 10.

18. A battery, comprising:
    an anode comprising magnesium as an active component;
    a cathode stable to a voltage of at least 3.2 V relative to a magnesium reference; and
    an electrolyte;
    wherein
    the electrolyte comprises a solvent and 2,2,6,6-tetramethylpiperidinyl-magnesium chloride-lithium chloride complex.

19. The battery according to claim 18, wherein the cathode stable to a voltage of at least 3.2 V relative to a magnesium reference comprises elemental sulfur.

20. The battery according to claim 19, wherein the solvent is tetrahydrofuran.

* * * * *

UNITED STATES PATENT AND TRADEMARK OFFICE
CERTIFICATE OF CORRECTION

PATENT NO. : 8,541,133 B2  Page 1 of 1
APPLICATION NO. : 12/913253
DATED : September 24, 2013
INVENTOR(S) : John Muldoon et al.

It is certified that error appears in the above-identified patent and that said Letters Patent is hereby corrected as shown below:

On the Title Page, Item (75), The third inventor "Masaki Matsui Matsui" should read
-- Masaki Matsui --

Signed and Sealed this
First Day of April, 2014

Michelle K. Lee
*Deputy Director of the United States Patent and Trademark Office*